(12) United States Patent
Ortiz Batallé

(10) Patent No.: US 10,406,606 B2
(45) Date of Patent: Sep. 10, 2019

(54) CHUCK WITH LOCKING DEVICE

(71) Applicant: Stryker Corporation, Kalamazoo, MI (US)

(72) Inventor: Antoni Ortiz Batallé, L'Hospitalet de Llobregat (ES)

(73) Assignee: STRYKER CORPORATION, Kalamazoo, MI (US)

( * ) Notice: Subject to any disclaimer, the term of this patent is extended or adjusted under 35 U.S.C. 154(b) by 0 days.

(21) Appl. No.: 15/761,867

(22) PCT Filed: Sep. 21, 2016

(86) PCT No.: PCT/IB2016/001325
§ 371 (c)(1),
(2) Date: Mar. 21, 2018

(87) PCT Pub. No.: WO2017/051232
PCT Pub. Date: Mar. 30, 2017

(65) Prior Publication Data
US 2018/0264557 A1    Sep. 20, 2018

(30) Foreign Application Priority Data
Sep. 22, 2015   (ES) .................................. 201531353

(51) Int. Cl.
*B23B 31/12*    (2006.01)

(52) U.S. Cl.
CPC ........ *B23B 31/123* (2013.01); *B23B 2260/02* (2013.01); *Y10T 279/17615* (2015.01); *Y10T 279/17632* (2015.01)

(58) Field of Classification Search
CPC ............... B23B 31/123; B23B 31/1238; Y10T 279/17615; Y10T 279/17623; Y10T 279/17632
See application file for complete search history.

(56) References Cited

U.S. PATENT DOCUMENTS

| 5,044,643 A | 9/1991 | Nakamura |
| 5,407,215 A * | 4/1995 | Yang ..................... B23B 31/123 |
| | | 279/140 |

(Continued)

FOREIGN PATENT DOCUMENTS

| CN | 2195990 Y | 5/1995 |
| CN | 1338343 A | 3/2002 |

(Continued)

OTHER PUBLICATIONS

English language abstract for WO2008122159 extracted from espacenet.com on Mar. 21, 2019; 2 pages.

(Continued)

*Primary Examiner* — Eric A Gates
(74) *Attorney, Agent, or Firm* — Howard & Howard Attorneys PLLC

(57) ABSTRACT

The chuck with locking device has a ratchet mechanism comprising a toothed ring (5) with asymmetrical teeth (5a) fixed to an outer casing (2), a ratchet ring (9) arranged such that it can slide but not rotate with respect to a base body (1) and provided with tabs (11) or teeth (9a) providing ratchet interlocking elements, a release elastic element arranged under compression between the ratchet ring (9) and the toothed ring (5), a locking ring (7) arranged adjacent to the ratchet ring (9) outside the base body (1) and fixed inside a locking control sleeve (14), a cam groove (8) formed in the locking ring (7), and a pin (13) inserted in the cam groove (8) and in a hole (30) formed in the base body (1). The locking control sleeve (14) moves the locking ring (7) and the ratchet ring (5) between locking and unlocking positions.

21 Claims, 10 Drawing Sheets

(56) References Cited

U.S. PATENT DOCUMENTS

| | | | |
|---|---|---|---|
| 7,503,565 B2 | 3/2009 | Rohm | |
| 7,726,663 B2 | 6/2010 | Mack et al. | |
| 8,403,339 B2 * | 3/2013 | Yaksich | B23B 31/123 |
| | | | 279/140 |
| 9,662,713 B2 | 5/2017 | Young et al. | |
| 2008/0217869 A1 | 9/2008 | Mack | |
| 2008/0231004 A1 | 9/2008 | Hu et al. | |
| 2013/0264781 A1 | 10/2013 | Mason | |
| 2017/0252832 A1 * | 9/2017 | Zhou | B23B 31/123 |

FOREIGN PATENT DOCUMENTS

| | | | | |
|---|---|---|---|---|
| CN | 201012399 | | 1/2008 | |
| CN | 101142047 A | | 3/2008 | |
| CN | 101676051 A | | 3/2010 | |
| CN | 201815693 | | 5/2011 | |
| DE | 4106129 A1 * | | 9/1992 | B23B 31/123 |
| DE | 202007008850 | | 8/2007 | |
| ES | 2326767 A1 | | 10/2009 | |
| ES | 1072879 | | 10/2010 | |
| GB | 1566855 | | 5/1980 | |
| WO | 2008122159 A1 | | 10/2008 | |

OTHER PUBLICATIONS

International Search Report and Written Opinion for PCT/ES2016/000006; 10 pages.
International Search report and written opinion dated Dec. 8, 2016 for corresponding PCT/IB2016/001325.
English language abstract and machine-assisted English translation for CN 2195990 extracted from espacenet.com database on May 9, 2019, 6 pages.
English language abstract and machine-assisted English translation for CN 1338343 extracted from espacenet.com database on May 9, 2019, 20 pages.
English language abstract for CN 101142047 extracted from espacenet.com database on May 9, 2019, 2 pages.
English language abstract for CN 101676051 extracted from espacenet.com database on May 9, 2019, 2 pages.
English language abstract for ES 2326767 extracted from espacenet.com database on May 9, 2019, 2 pages.

\* cited by examiner

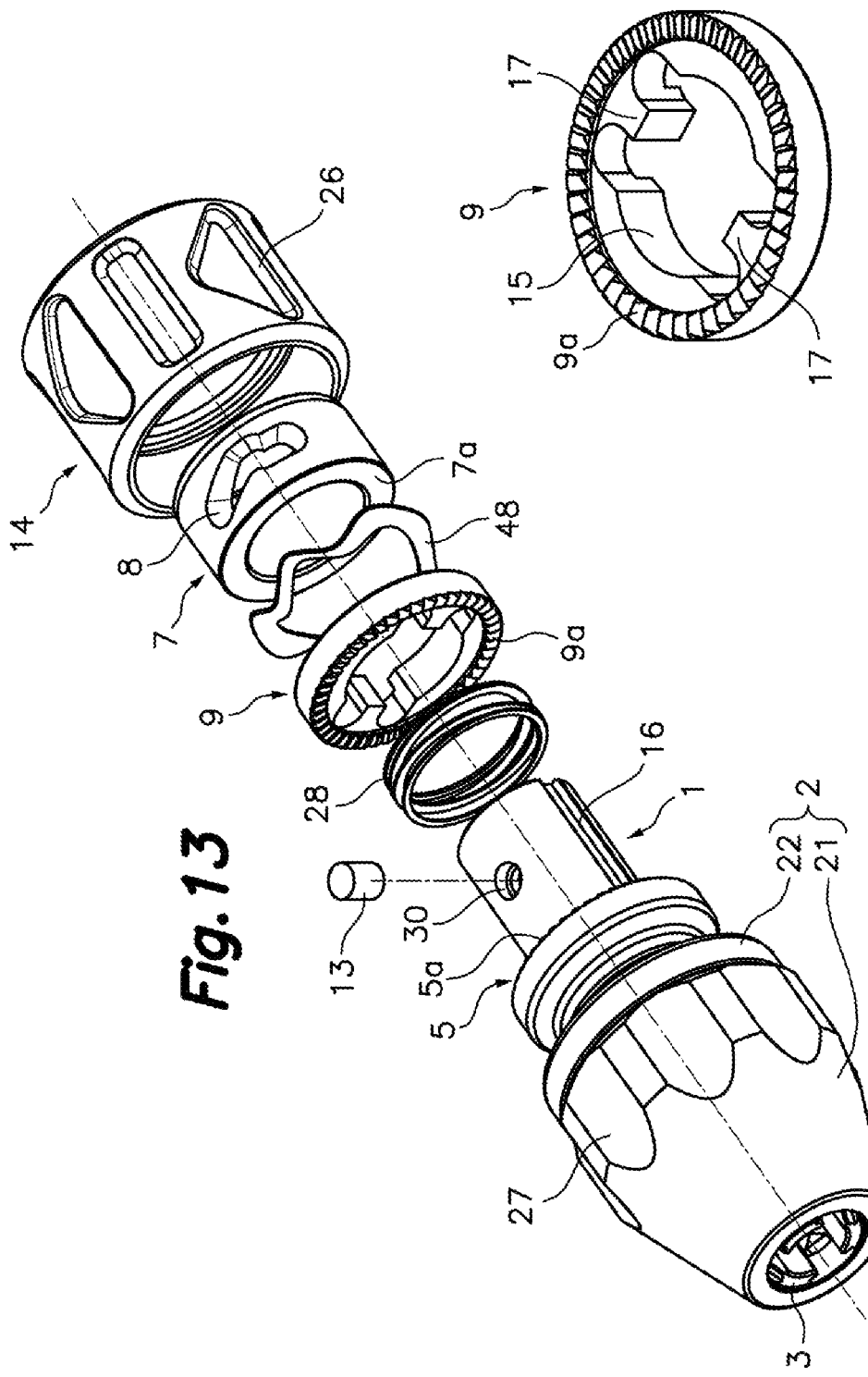

CHUCK WITH LOCKING DEVICE

RELATED APPLICATIONS

This application is a US national phase application of international application No. PCT/IB2016/001325, filed 21 Sep. 2016, which designates the US and claims priority to Spanish application P 201531353 filed 22 Sep. 2015, the contents of each of which are hereby incorporated by reference as if set forth in their entireties.

TECHNICAL FIELD

The present invention relates to a chuck provided with a locking device that can be manually operated by a user for locking the jaws of the chuck in a gripping position, preventing the jaws from loosening regardless of the rotation direction of the chuck.

BACKGROUND OF THE INVENTION

Keyless chucks are known which comprise a base body having a central longitudinal axis and connected for rotating with a drive shaft, and an outer casing coupled outside the base body such that it can rotate coaxially but not move axially with respect to the base body. The outer casing has an axial opening, and a plurality of jaws are arranged movably with respect to the outer casing and communicated with the axial opening. A pusher is coupled to the base body by a threaded coupling and furthermore coupled to the outer casing such that it can slide axially but not rotate coaxially. The pusher is operatively coupled with the jaws, such that rotation of the pusher with respect to the base body in a tightening direction moves the jaws towards the central longitudinal axis to grip a tool, and rotation of the pusher with respect to the base body in a opposite loosening direction moves the jaws away from the central longitudinal axis to release the tool.

However, when keyless chucks of this type are used in machines or motor-driven power tools with a reversible rotation direction or in hand-powered tools, there is a risk that the jaws will loosen in an unwanted manner if the machine, the power tool or the hand-powered tool is operatively driven in a reverse rotation direction coinciding with the mentioned loosening direction for loosening the jaws.

To prevent this risk, some known keyless chucks incorporate a locking device that allows locking the jaws in a gripping position. For example, patent document U.S. Pat. No. 8,403,339 B2 discloses a keyless chuck of the type described above including a locking device comprising a toothed ring that is fixed with respect to the base body and provided with a plurality of asymmetrical teeth having a saw tooth profile, a locking ring coupled outside the outer casing such that it can rotate but not move axially with respect to the outer casing, and a ratchet ring moving axially with respect to the outer casing and with respect to the locking ring between axial locking and unlocking positions when the locking ring is rotated coaxially with respect to the base body in cooperation with a cam and an elastic element. The ratchet ring has a plurality of asymmetrical ratchet teeth opposite and conjugated with the asymmetrical teeth of the toothed ring. When the ratchet ring is in the axial locking position, the ratchet teeth are coupled with the teeth of the toothed ring, blocking relative rotation between the base body and the outer casing in a loosening direction for loosening the grip of the jaws but allowing, by virtue of the asymmetrical profile of the teeth and of the elastic element, relative rotation in a tightening direction for tightening the grip of the jaws, and when the ratchet ring is in the axial release position, the ratchet teeth are separated and free of contact with the toothed ring.

In said patent document U.S. Pat. No. 8,403,339 B2, the elastic element is arranged such that it permanently pushes the ratchet ring towards the axial locking position and the cam moves the ratchet ring towards the axial unlocking position in opposition to the force exerted by the elastic element.

Utility model document ES 1072879 U discloses a chuck including a hybrid-type fitting mechanism combining a self-tightening mechanism with a key mechanism. Nevertheless, this hybrid-type chuck does not include a locking mechanism.

DISCLOSURE OF THE INVENTION

The present invention provides a chuck with locking device comprising a base body having a central longitudinal axis and being connectable for rotating with a drive shaft, an outer casing coupled outside the base body such that it can rotate coaxially but not move axially with respect to the base body, a plurality of jaws arranged movably with respect to the base body and the outer casing communicated with an axial opening thereof, and a fitting mechanism linking movements of the outer casing to movements of the jaws, such that rotation of the outer casing with respect to the base body in a tightening direction moves the jaws towards said central longitudinal axis and rotation of the outer casing with respect to the base body in an opposite loosening direction moves the jaws away from the central longitudinal axis.

The chuck of the present invention further comprises a locking device including a ratchet mechanism operated by a locking control sleeve, which is coupled outside the base body such that it can rotate between angular locking and release positions in cooperation with a cam and an elastic element. When the locking control sleeve is in the angular locking position, the ratchet mechanism blocks relative rotation between the base body and the outer casing in a loosening direction for loosening the grip of the jaws but allows relative rotation in a tightening direction for tightening the grip of the jaws, and when the locking control sleeve is in the angular release position, the ratchet mechanism allows relative rotation between the base body and the outer casing in both directions.

The ratchet mechanism comprises a toothed ring, a ratchet ring and a locking ring. The toothed ring is fixed with respect to the outer casing and has a plurality of asymmetrical teeth located, for example, in a plane perpendicular to the central longitudinal axis or in a cone coaxial with the central longitudinal axis. The ratchet ring is arranged facing the toothed ring such that it can slide axially but not rotate coaxially with respect to the base body. The ratchet ring has an annular body and one or more tabs or teeth projecting from the annular body inclined towards the asymmetrical teeth of the toothed ring. The mentioned elastic element is a releasing elastic element arranged under compression between the ratchet ring and the toothed ring such that the releasing elastic element permanently pushes the ratchet ring away from the toothed ring.

In one embodiment, the ratchet ring is made of solid material, such as a solid metal, and said teeth of the ratchet ring are complementary to the asymmetrical teeth of the toothed ring. In this embodiment a pressing elastic element is arranged under compression between the ratchet ring and the locking ring to push the ratchet ring to the toothed ring.

In another embodiment, the ratchet ring is made of sheet metal and the annular body has cuts defining said tabs as interlocking elastic tabs projecting from the annular body inclined towards the asymmetrical teeth of the toothed ring. Each of these interlocking elastic tabs has a free end providing a ratchet pawl.

Whether the ratchet ring is solid material or metal sheet, the locking ring is arranged outside the base body and fixed inside the locking control sleeve in a position adjacent to the ratchet ring on a side thereof opposite the toothed ring. When the ratchet ring is made of metal sheet, the locking ring has a support surface in contact with the ratchet ring.

The mentioned cam comprises a cam groove formed in a wall of the locking ring and a pin inserted in the cam groove and in a hole perpendicular to the central longitudinal axis formed in the base body. The cam groove determines axial movement of the locking ring between axial locking and release positions corresponding to the angular locking and release positions of the locking control sleeve, respectively, when the locking ring is rotated by the locking control sleeve coaxially with respect to the base body in cooperation with the cam.

When the locking ring is in the axial locking position, the locking ring presses the ratchet pawls of the ratchet ring against the toothed ring in opposition to a force exerted by the releasing elastic element, and the ratchet pawls are coupled with the asymmetrical teeth of the toothed ring blocking relative rotation between the base body and the outer casing in a loosening direction for loosening the grip of the jaws but allowing, by virtue of the asymmetrical profile of the teeth and of the elasticity of the interlocking elastic tabs or of the elasticity of the pressing elastic element which pushes the ratchet ring towards the toothed ring, relative rotation in a tightening direction for tightening the grip of the jaws. When the locking ring is in the axial release position, the locking ring allows the force exerted by the releasing elastic element to separate the ratchet pawl from the toothed ring such that the outer casing can rotate freely in both directions with respect to the base body.

Preferably, the pin is inserted in the hole of the base body with sliding fit, and the locking control sleeve is externally press coupled onto the locking ring with interference fit. Therefore, an inner surface of the locking control sleeve covers the cam groove and retains the pin inserted in the cam groove and in the hole of the base body.

In one embodiment, the releasing elastic element is formed by a coil spring arranged around the base body and having a first end supported in a support surface of the ratchet ring located between the interlocking elastic tabs and a central hole of the annular body, and a second end supported in an annular seat formed in the outer casing between the toothed ring and the base body.

In another embodiment, the releasing elastic element is formed by one or more elastic spring tabs formed in the ratchet ring. These elastic spring tabs are defined by additional cuts formed in the annular body of the ratchet ring and are bent such that they project from the ratchet ring inclined towards the toothed ring. In the absence of external stresses, each of the elastic spring tabs has a rounded end portion resting on the asymmetrical teeth of the toothed ring. The rounded end portions are arranged at a greater axial distance from the ratchet ring than the ratchet pawls of the interlocking elastic tabs. Therefore, the rounded end portions of the elastic spring tabs rest on the asymmetrical teeth of the toothed ring before the ratchet pawls of the interlocking elastic tabs are coupled with the asymmetrical teeth of the toothed ring, and slip over the asymmetrical teeth of the toothed ring when the ratchet ring rotates in either of the two directions.

In both embodiments of the sheet metal ratchet ring, the ratchet ring is obtained by press forming or by laser cutting from a spring steel sheet element.

In one embodiment, the fitting mechanism of the chuck with locking device of the present invention is a keyless-type mechanism known as a self-tightening mechanism, which comprises a pusher coupled by threading to the base body and arranged operatively coupled with the jaws. Conventionally, chucks provided with a fitting mechanism of this type tend to tighten the bit when they rotate in a first rotation direction, but tend to loosen the bit when they rotate in a second opposite direction, so they are only suitable for working when rotating in the first rotation direction. With the incorporation of the locking device of the present invention, the self-tightening chuck having the fitting mechanism tightened to grip a drill bit and the locking device in the locking position is able to firmly hold the bit and apply torque rotating in both directions, i.e., right-hand rotation, left-hand rotation, and alternately right-hand and left-hand reciprocating rotation, and the locking device prevents slipping of the bit with respect to the jaws in both right-hand and left-hand rotations.

In another embodiment, the fitting mechanism of the chuck with locking device of the present invention is of a conventional type normally using a key, which comprises an actuator ring fixed to the outer casing and provided with screw threads coupled to thread teeth formed in the jaws. However, with the incorporation of the locking device of the present invention, the key mechanism is omitted because the locking device allows the chuck to firmly hold the bit with the fitting mechanism and apply torque with right-hand rotation, left-hand rotation, and alternately right-hand and left-hand reciprocating rotation. Furthermore, in this embodiment, when high torque is applied with the chuck by rotating in the tightening direction, the locking device allows easily removing the bit by loosening the chuck by hand.

In yet another embodiment, the fitting mechanism of the chuck with locking device of the present invention is a hybrid-type fitting mechanism, such as the one described in said utility model document ES 1072879 U, combining the self-tightening fitting mechanism with a key mechanism. Since the coupling between the pusher and the base body, which causes the axial movement of the jaws, is a left-hand thread coupling, when the tool holding the chuck no longer rotates and the drilling machine keeps trying to rotate to the right, the fitting mechanism self-tightens. The problem resides in that some times excessive self-tightening takes place which cannot be loosened by hand without the aid of a key. This problem is solved with the hybrid chuck with a combined self-tightening and key mechanism. Furthermore, with the incorporation of the locking device of the present invention, the self-tightening chuck with a key is able to firmly hold the bit and apply torque by rotating in both directions, i.e., right-hand rotation, left-hand rotation, and alternately right-hand and left-hand reciprocating rotation.

It is to be pointed out that the locking device and ratchet mechanism of the present invention, whether the ratchet ring is solid material or metal sheet, is compatible with any one of the keyless self-tightening fitting mechanism, the conventional type fitting mechanism with a key, the conventional type keyless fitting mechanism, and the self-tightening fitting mechanism with a key.

BRIEF DESCRIPTION OF THE DRAWINGS

The foregoing and other features and advantages will be more fully understood from the following description of the embodiments provided with a merely illustrative and non-limiting character in reference to the attached drawings, in which:

FIG. 13 is an exploded perspective view of the chuck of FIG. 12; and

FIG. 14 is a perspective view of a ratchet ring forming part of the chuck of FIG. 13.

DETAILED DESCRIPTION OF EMBODIMENTS

Figure 1:
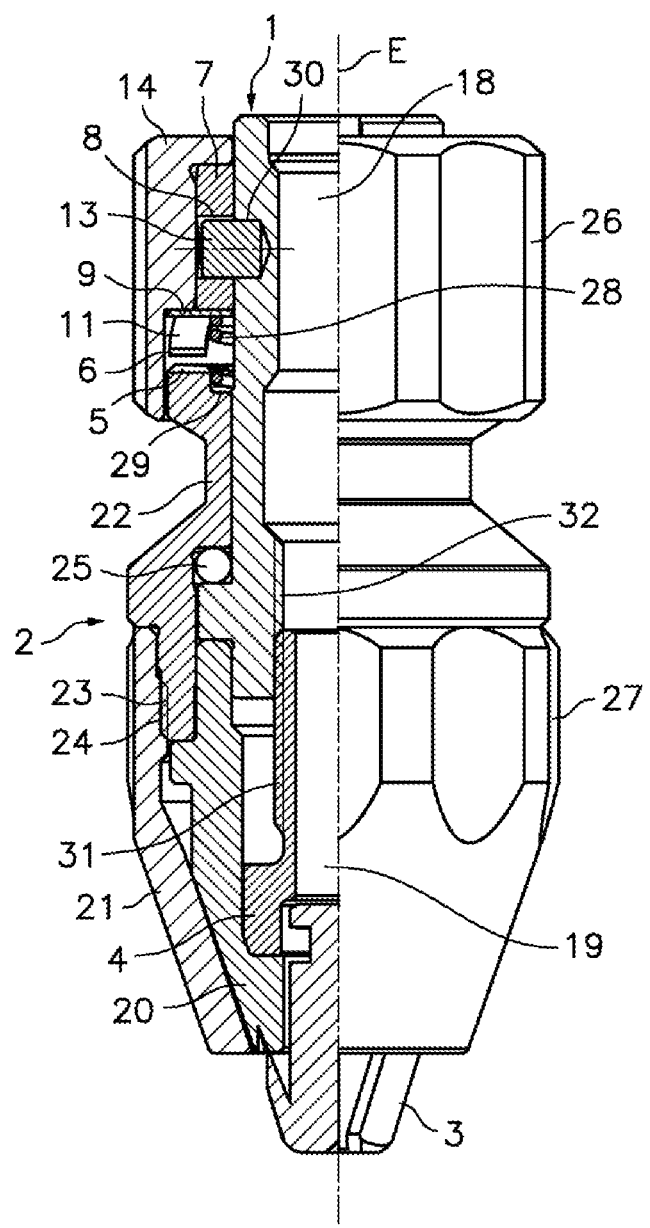
FIG. 1 is a partially sectioned side view of a chuck with locking device according to an embodiment of the present invention.
Figure 2:
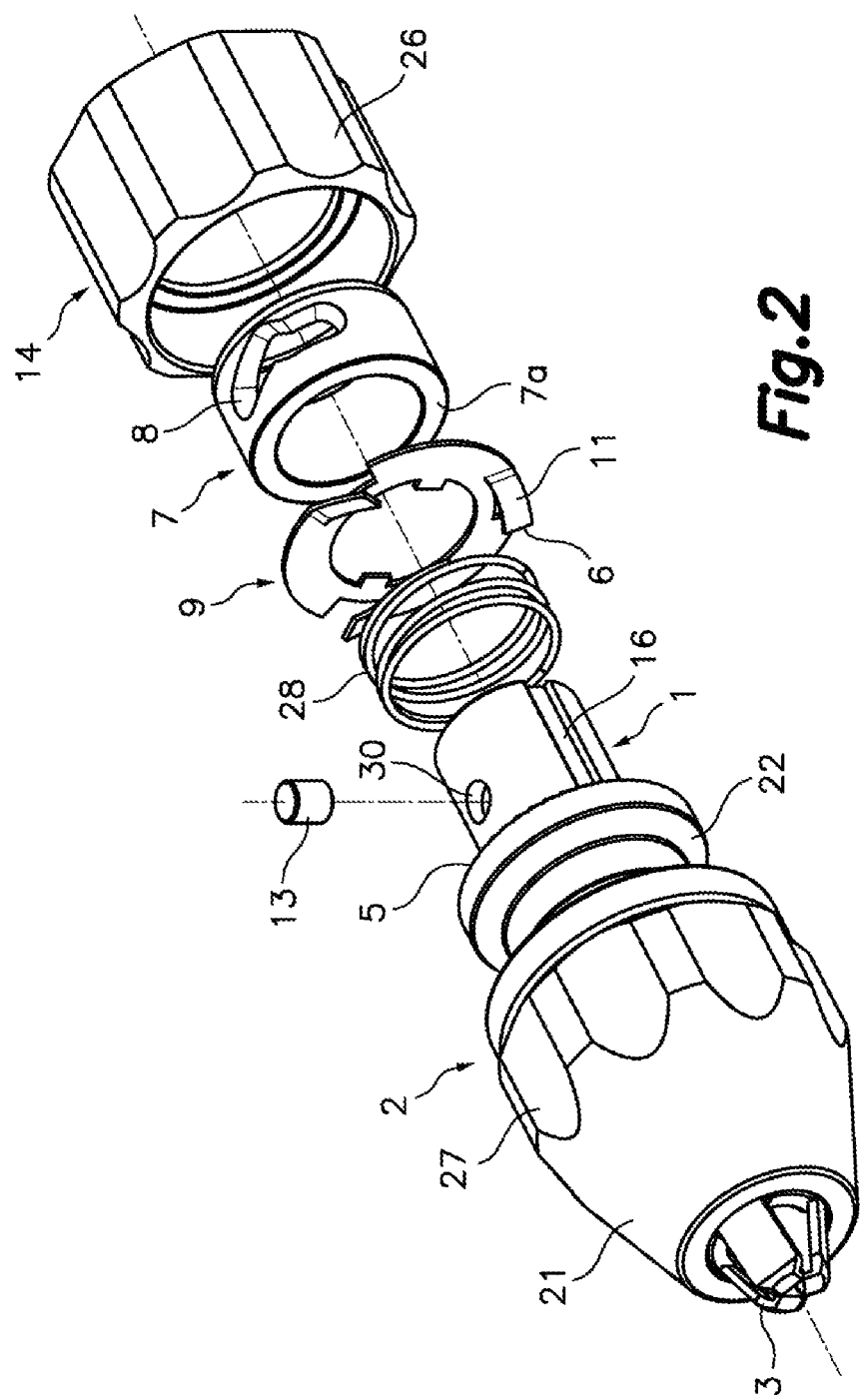
FIGS. 2 and 3 are front and rear partially exploded perspective views of the chuck of FIG. 1.
Figure 3:
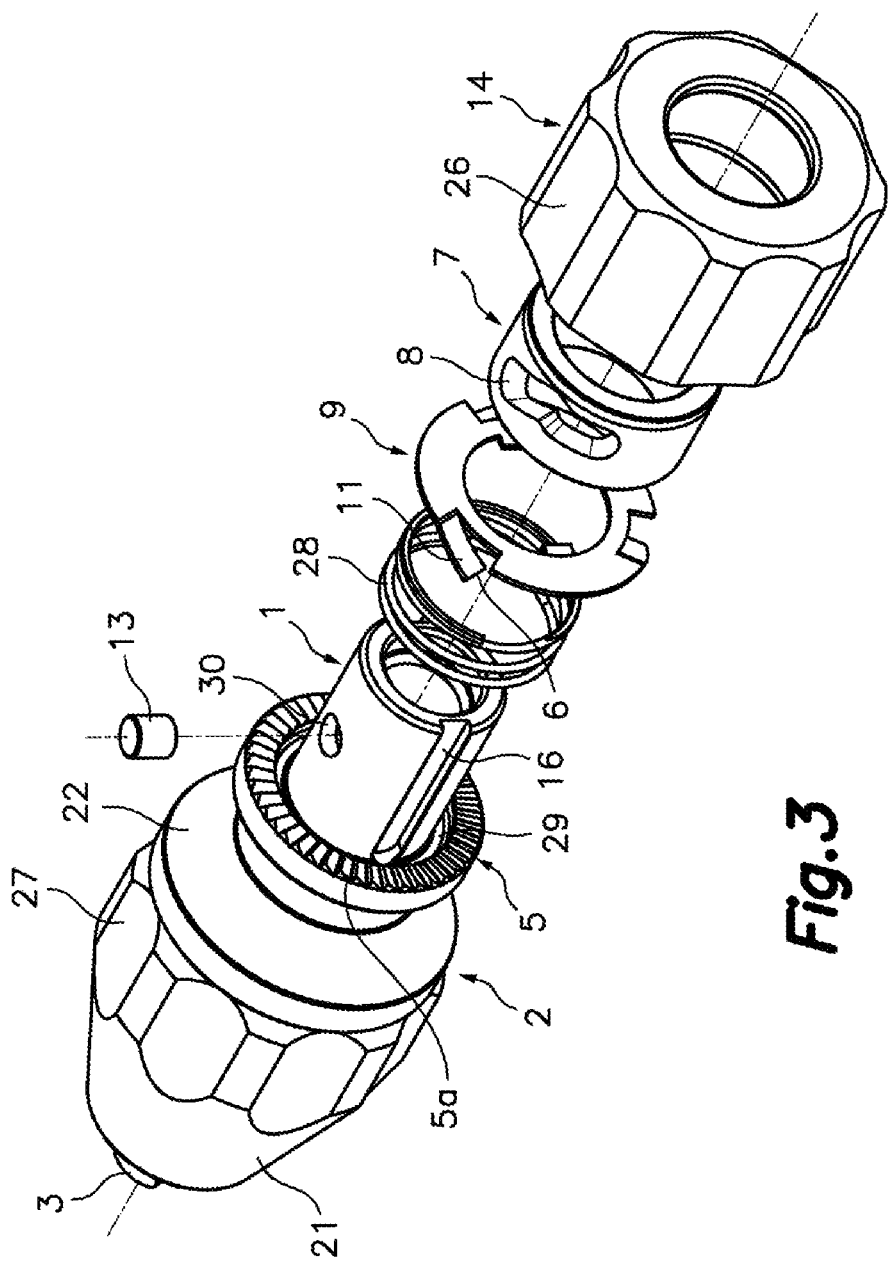

First referring to FIGS. 1 to 3, the chuck with locking device of the present invention comprises, according to an embodiment, a base body 1 having a central longitudinal axis E and being able to be connected to a drive shaft (not shown) for rotating therewith. The drive shaft can belong to a machine, to a power tool or to a hand-powered tool, and it can be able to rotate in both directions.

An outer casing 2 is coupled outside the base body 1 such that it can rotate coaxially but not move axially with respect to the base body 1. The outer casing 2 comprises a front fitting sleeve 21 and a rear sleeve 22 fixedly connected to one another by a threaded coupling 23, 24. Jaws 3 which are coupled to guides formed in a guide body 20 housed in the front fitting sleeve 21 and immobilized with respect to the outer casing 2 are located inside the front fitting sleeve 21, such that the jaws 3 are movable with respect to the outer casing 2 and are communicated with an axial opening of the front fitting sleeve 21. The outer casing 2 rotates with respect to the base body 1 in cooperation with rolling elements 25 arranged between the rear sleeve 22 and the base body 1. The rolling elements 25 are configured to withstand mainly axial loads.

The chuck includes a fitting mechanism linking movements of the outer casing 2 to movements of the jaws 3 to fit the jaws 3 to bits having different diameters. In this embodiment, the fitting mechanism is a keyless self-tightening mechanism comprising a pusher 4 coupled to the base body 1 by a threaded coupling 31, 32 and coupled to the outer casing 2 such that it can slide axially but not rotate coaxially. More specifically, the pusher 4 has outer screw threads 31 coupled to inner screw threads 32 formed in the base body 1, such that relative rotation between the pusher 4 and the base body 1 translates into axial displacement of the pusher 4.

The guides of the guide body 20 in which the jaws 3 are coupled are inclined in converging directions towards the central longitudinal axis E and the pusher 4 is coupled to the jaws 3 with the ability to operate them, such that rotation of the outer casing 2 together with the pusher 4 with respect to the base body 1 in a tightening direction moves the jaws 3 out of the front fitting sleeve 21 and towards the central longitudinal axis E, and rotation of the outer casing 2 together with the pusher 4 with respect to the base body 1 in an opposite loosening direction moves the jaws 3 into the front fitting sleeve 21, away from the central longitudinal axis E. The front fitting sleeve 21 has an outer surface provided with gripping embossments 27 facilitating a manual grip thereof.

Preferably, the base body 1 has an axial through hole 18 and the pusher 4 has an axial through hole 19 aligned and communicated with said axial through hole 18 of the base body 1, which allows gripping rods inserted along the entire length of the chuck with the jaws 3.

To prevent the grip of the jaws 3 from loosening when the drive shaft rotates the chuck in the mentioned loosening direction, the chuck includes a locking device comprising a ratchet mechanism operated by a locking control sleeve 14 coupled outside the base body 1 at an end opposite the front fitting sleeve 21.

Figure 5:
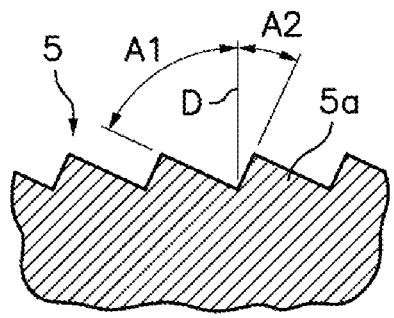
FIG. 5 is a section view illustrating the asymmetrical tooth profile of a toothed ring forming part of the chuck of FIGS. 1 to 3.

The ratchet mechanism comprises a toothed ring 5 formed at a rear end of the rear sleeve 22. This toothed ring has a plurality of asymmetrical teeth 5a located radially in a plane perpendicular to the central longitudinal axis E. FIG. 5 illustrates the asymmetrical profile of the teeth 5a, where each tooth has a rear face (in relation to the relative tightening rotation direction) forming a first angle A1 with respect to a direction D parallel to the central longitudinal axis E and a front face forming a second angle A2 with respect to the direction D parallel to the central longitudinal axis E, the first angle A1 being larger than the second angle A2.

The ratchet mechanism further comprises a ratchet ring 9 (shown by itself in FIG. 6), which is obtained, for example, by press forming or by laser cutting from a spring steel sheet element. The ratchet ring 9 has a planar annular body with a central hole 15, retaining tongues 17 extending towards the central longitudinal axis E from an inner edge of said central hole 15, and cuts defining three interlocking elastic tabs 11 distributed at equal angular intervals around the ratchet ring 9. The interlocking elastic tabs 11 are bent such that they project in an inclined manner away from the planar annular body. Each of the interlocking elastic tabs 11 has a free end providing a ratchet pawl 6.

The base body 1 has a cylindrical portion in an outer surface of which retaining grooves 16 are formed (FIGS. 2 and 3) parallel to the central longitudinal axis E. This cylindrical portion of the base body 1 is inserted in a sliding manner through the central hole 15 of the ratchet ring 9 with the retaining tongues 17 of the ratchet ring 9 inserted in the retaining grooves 16. Therefore, the retaining tongues 17 in cooperation with the retaining grooves 16 of the base body 1 prevent relative rotation between the ratchet ring 9 and the base body 1 but allow axial movement of the ratchet ring 9 with respect to the base body 1.

The ratchet ring 9 is arranged adjacent to and facing the toothed ring 5, and with the interlocking elastic tabs 11 oriented towards the toothed ring 5. A releasing elastic element is arranged under compression between the ratchet ring 9 and the toothed ring 5, said releasing elastic element being formed by a coil spring 28 having a first end supported in a support surface 10 of the planar annular body of the ratchet ring 9 located between the interlocking elastic tabs 11 and the central hole 15, and a second end supported in an annular seat 29 formed in the outer casing 2 between the toothed ring 5 and the base body 1. Therefore, the coil spring 28 permanently pushes the ratchet ring 9 towards a direction of moving away from the toothed ring 5.

A locking ring 7 is arranged outside the base body 1 in a position adjacent to the ratchet ring 9 on a side thereof opposite the toothed ring 5. The locking ring has a support surface 7a in contact with the ratchet ring 9. A cam 8 is formed in a cylindrical side wall of the locking ring 7.

Figure 4:
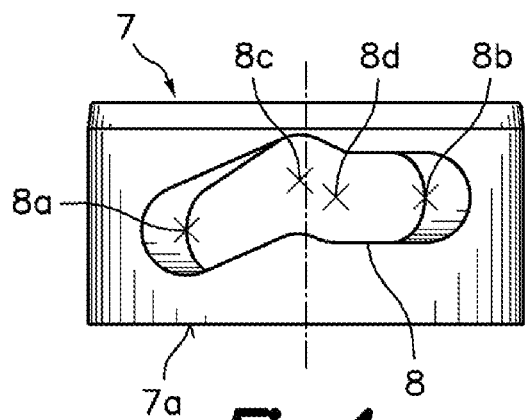
FIG. 4 is a side view of a locking ring including a cam groove forming part of the chuck of FIGS. 1 to 3.

As is best shown in FIG. 4, the cam 8 of the locking ring 7 is formed by a cam groove extending in a circumferential direction between a first end 8a and a second end 8b. The first end 8a of the cam groove is closer in an axial direction to the support surface 7a than the second end 8b. The cam groove furthermore has a first intermediate point 8c located closer in the circumferential direction to the first end 8a than to the second end 8b and farther away in the axial direction from the support surface 7a than the second end 8b, and a second intermediate point 8d located closer in the circumferential direction to the second end 8b than to the first end 8a and at the same distance in the axial direction from the support surface 7a as the second end 8b. The cam groove defines between the first end 8a and the first intermediate point 8c an inclined path with respect to the support surface 7a, and between the second intermediate point 8d and the second end 8b a path parallel to the support surface 7a.

A pin 13 is inserted in the cam groove, which constitutes the cam 8 of the locking ring 7, and in a hole 30 perpendicular to the central longitudinal axis E formed in the base body 1. The pin 13 has a diameter conjugate with a width of the cam groove such that the pin 13 can slide along the cam 8. Therefore, the cam 8, in cooperation with the pin 13, determines axial movement of the locking ring 7 between an axial locking position and an axial release position when the locking ring 7 is rotated in relation to the base body 1 between an angular release position, limited by the first end 8a of the cam groove, and an angular locking position, limited by the second end 8b of the cam groove.

Therefore, when the locking control sleeve 14 is placed in the angular and axial locking position, the locking ring 7 presses the ratchet pawls 6 against the toothed ring 5 in opposition to a force exerted by the coil spring 28, and this blocks relative rotation between the base body 1 and the outer casing 2 in a loosening direction for loosening the grip of the jaws 3 but allows relative rotation in a tightening direction for tightening the grip of the jaws 3 by virtue of the elasticity of the interlocking elastic tabs 11. When the locking control sleeve 14 is placed in the angular and axial release position, the locking ring 7 allows the coil spring 28 to separate the ratchet pawls 6 from the toothed ring 5, which allows free relative rotation between the base body 1 and the outer casing 2 in both directions.

The compression of the coil spring 28 is greater in the angular locking position than in the angular release position. Nevertheless, to go from the angular locking position to the angular release position it is necessary to overcome additional compression of the coil spring 28 caused by a small ramp in the cam groove from the second intermediate point 8d to first intermediate point 8c, preventing unintentional unlocking of the ratchet mechanism.

The aforementioned locking control sleeve 14 is fixed outside the locking ring 7 and has an inner surface covering the cam groove of the cam 8 and retaining the pin 13 inserted in the cam groove and in the hole 30 of the base body 1. The locking control sleeve 14 has an outer surface provided with gripping embossments 26 facilitating a manual grip to rotate the locking control sleeve 14 together with the locking ring 7 between the angular and axial release position, demarcated by the first end 8a of the cam groove, and the angular and axial locking position, demarcated by the second end 8b of the cam groove.

Figure 6:
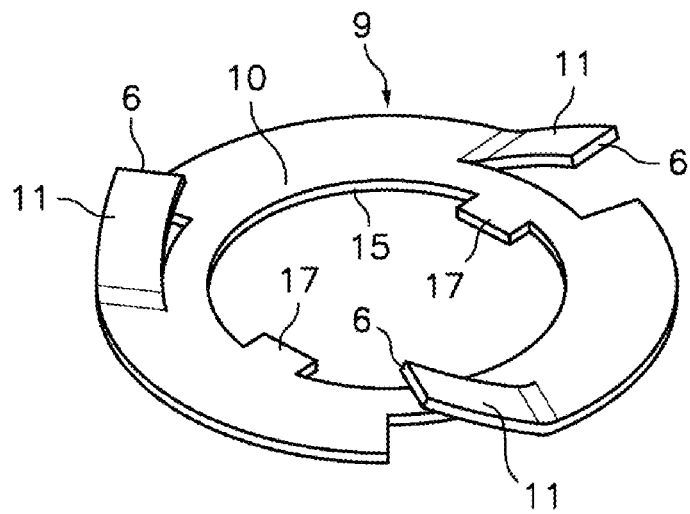
FIG. 6 is a perspective view of a ratchet ring forming part of the chuck of FIGS. 1 to 3.
Figure 7:
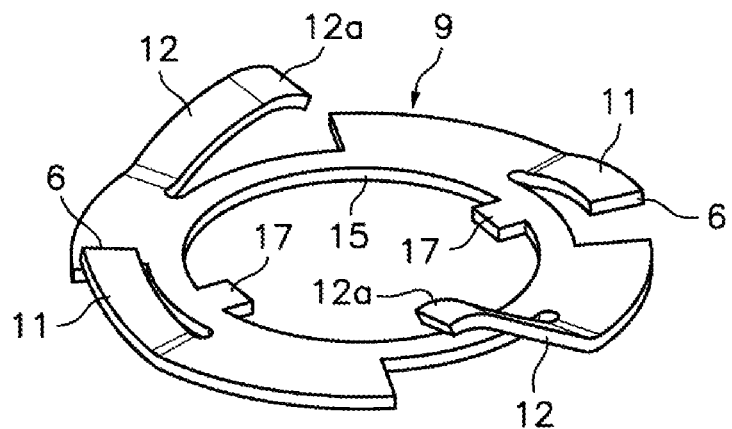
FIG. 7 is a perspective view of a ratchet ring forming part of a chuck with locking device according to a variant of the embodiment shown in FIGS. 1 to 3.

FIG. 7 shows a ratchet ring 9 belonging to another embodiment (not shown) of the chuck of the present invention, which only differs from the embodiment described above in relation to FIGS. 1 to 6 in that the releasing elastic element is formed by elastic spring tabs 12 derived from ratchet ring 9 itself instead of by the coil spring 28.

The ratchet ring of FIG. 7 has cuts defining two interlocking elastic tabs 11 located in diametrically opposed positions and additional cuts defining two elastic spring tabs 12 arranged in diametrically opposed positions intercalated between the interlocking elastic tabs 11. Both the interlocking elastic tabs 11 and the elastic spring tabs 12 are bent such that they project in an inclined manner outwards and towards the same side of the planar annular body. Each of the interlocking elastic tabs 11 has a free end providing a ratchet pawl 6 configured for interlocking in the asymmetrical teeth 5a of the toothed ring 5, and each of the elastic spring tabs 12 has a rounded end portion 12a configured for resting on and slipping over the asymmetrical teeth 5a of the toothed ring 5.

The rounded end portions 12a of the elastic spring tabs 12 are arranged at a greater axial distance from the planar annular body of the ratchet ring 9 than the ratchet pawls 6 of the interlocking elastic tabs 11, such that when the locking control sleeve 14 is placed in the angular and axial unlocking position, the locking ring 7 allows a force exerted by the elastic spring tabs 12 to separate the ratchet pawls 6 from the toothed ring 5, and when the locking control sleeve 14 is placed in the angular and axial locking position, the locking ring 7 presses the ratchet pawls 6 against the asymmetrical teeth 5a of the toothed ring 5 in opposition to the force exerted by the elastic spring tabs 12.

Figure 8:
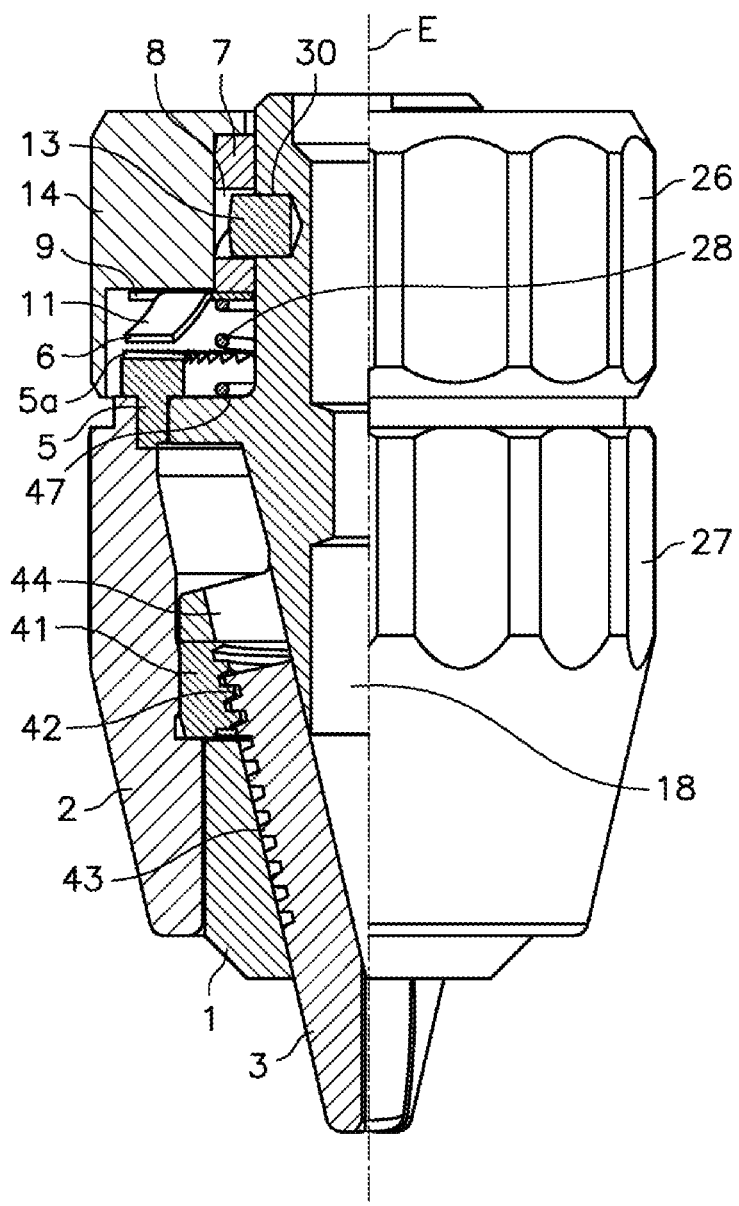
FIG. 8 is a partially sectioned side view of a chuck with locking device according to another embodiment of the present invention.
Figure 9:
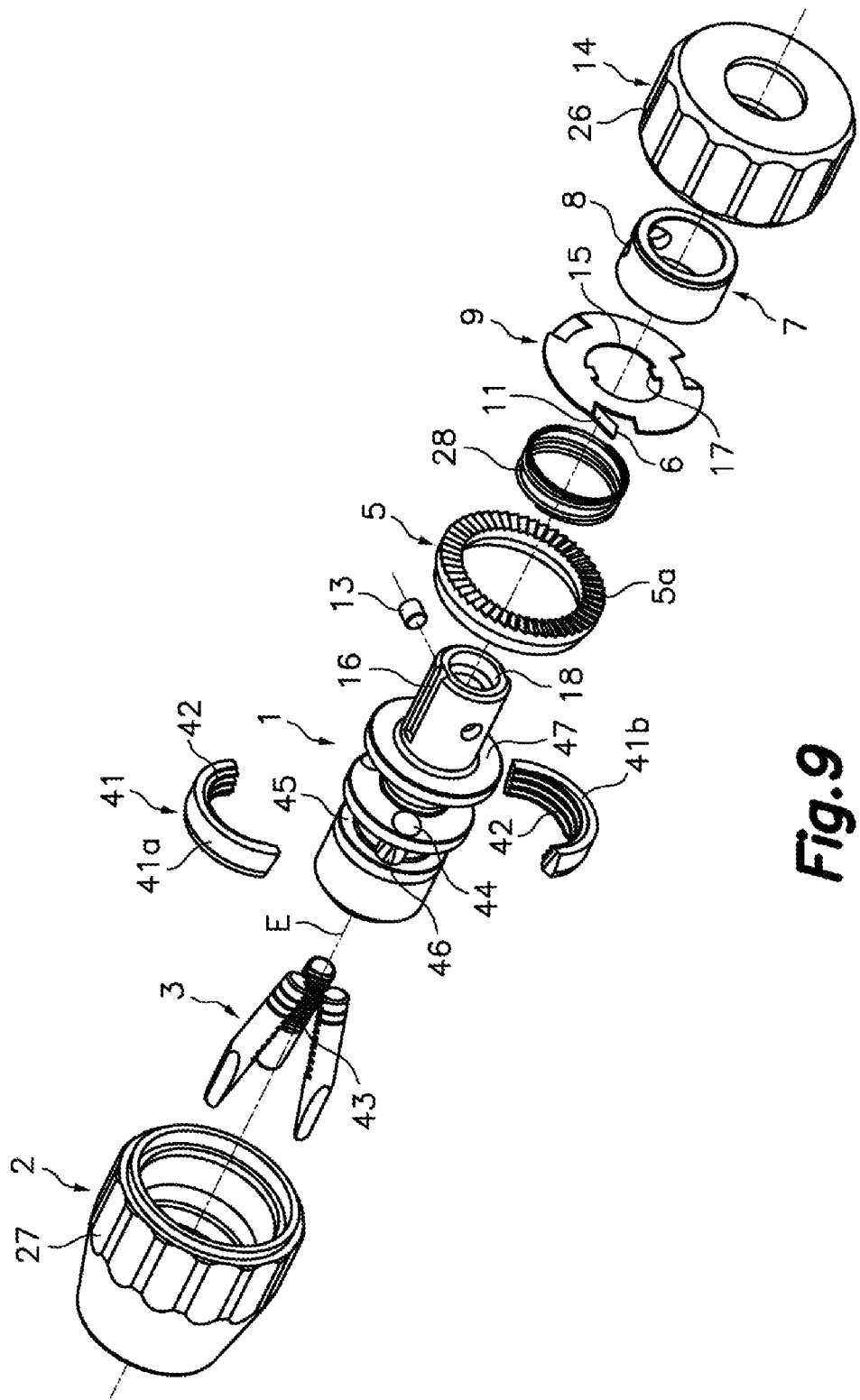
FIG. 9 is an exploded perspective view of the chuck of FIG. 8.
Figure 10:
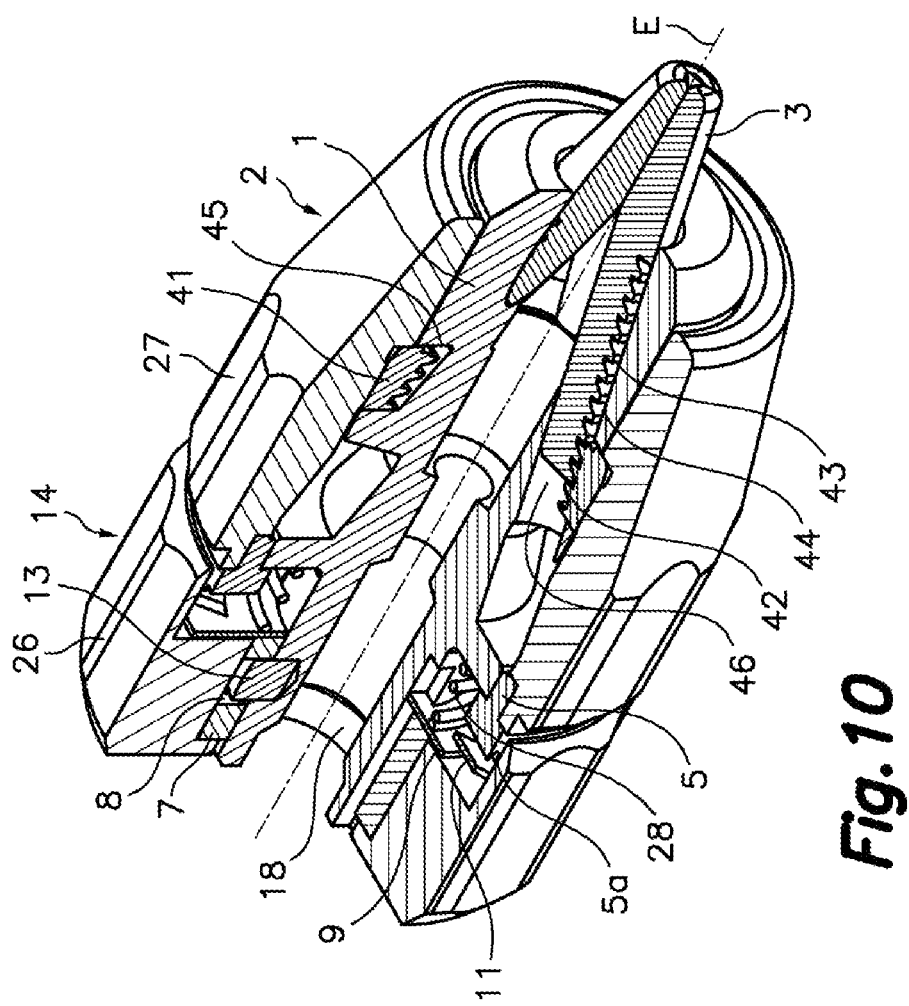
FIG. 10 is a partially sectioned perspective view of the chuck of FIGS. 8 and 9.

FIGS. 8 to 10 show another alternative embodiment of the chuck with locking device of the present invention, comprising a base body 1, an outer casing 2, three jaws 3 to grip a bit (not shown), a fitting mechanism linking movements of the outer casing 2 to movements of the jaws 3 to fit the jaws 3 to bits having different diameters, and a locking device.

The base body 1 has a central longitudinal axis E and is suitable for being connected to a drive shaft for rotating therewith. The outer casing 2 is coupled outside the base body 1 such that it can rotate coaxially but not move axially with respect to the base body 1. The base body 1 has an axial through hole 18 and three guide holes 44 distributed at regular intervals around the central longitudinal axis E and inclined in converging directions towards the central longitudinal axis E. The outer casing 2 has an axial opening.

The three jaws 3 are housed in a movable manner in the three guide holes 44 such that they emerge through the axial opening of the outer casing 2. The base body 1 has formed therein a circumferential groove 45 having intersections 46 with the guide holes 44, and the jaws 3 have formed therein thread teeth 43 that are exposed in the intersections 46.

The fitting mechanism comprises an actuator ring 41 fixed inside the outer casing 2. The actuator ring 41 is inserted in the circumferential groove 45 of the base body 1 and makes sliding contact with facing opposite surfaces of the circumferential groove 45, allowing the joint rotation of the actuator ring 41 and the outer casing 2 with respect to the base body 1 and preventing axial displacement of the actuator ring 41 and the outer casing 2 with respect to the base body 1. The actuator ring 41 is made in two halves 41a, 41b (FIG. 9) for the sole purpose of facilitating construction and assembly.

The actuator ring 41 has screw threads 42 meshing with the thread teeth 43 of the jaws 3 in the intersections 46, such that rotation of the outer casing 2 together with the actuator ring 41 with respect to the base body 1 in a tightening direction moves the jaws 3 towards the central longitudinal axis E, and rotation of the outer casing 2 together with the actuator ring 41 with respect to the base body 1 in an opposite loosening direction moves the jaws 3 away from the central longitudinal axis E.

The locking device is similar to the one described above in relation to FIGS. 1 to 3 and comprises a ratchet mechanism operated by a locking control sleeve 14 coupled outside the base body 1 such that it can rotate between angular locking and release positions in cooperation with a cam 8 and a releasing elastic element. When the locking control sleeve 14 is in the angular locking position, the ratchet mechanism blocks relative rotation between the base body 1 and the outer casing 2 in a loosening direction for loosening the grip of the jaws 3 but allows relative rotation in a tightening direction for tightening the grip of the jaws 3, and when the locking control sleeve 14 is in the angular release position, the ratchet mechanism allows relative rotation between the base body 1 and the outer casing 2 in both directions.

The ratchet mechanism comprises a toothed ring 5, a ratchet ring 9, a locking ring 7, and a releasing elastic element. The toothed ring 5 has a plurality of asymmetrical teeth 5a and is fixed with respect to the outer casing 2.

The ratchet ring 9, which is similar to the one shown in FIG. 6, is made of sheet metal and has a central hole 15 and one or more interlocking elastic tabs 11 providing ratchet pawls 6 facing the asymmetrical teeth 5a of the toothed ring 5. Retaining tongues 17 which are inserted in retaining grooves 16 parallel to the central longitudinal axis E that exist in a cylindrical portion of the base body 1 extend from an inner edge of the central hole 15, such that the ratchet ring 9 can slide axially but not rotate coaxially with respect to the base body 1.

The locking ring 7 is arranged outside the base body 1 and fixed inside the locking control sleeve 14 in a position adjacent to a side of the ratchet ring 9 opposite the toothed ring 5. In this embodiment, the releasing elastic element is formed by a coil spring 28 arranged under compression between the ratchet ring 9 and an annular seat 47 formed in the base body 1, such that the coil spring 28 permanently pushes the ratchet ring 9 towards a direction of moving away from the toothed ring 5. Alternatively, the releasing elastic element can be formed by elastic spring tabs 12 derived from the ratchet ring 9 as described above in relation to FIG. 7.

The mentioned cam 8 comprises a cam groove formed in a wall of the locking ring 7. A pin 13 is inserted in the cam groove and in a hole 30 perpendicular to the central longitudinal axis E formed in the base body 1. The cam 8 is similar to the one described above in relation to FIG. 8. When the locking ring 7 is rotated with respect to the base body 1 together with the locking control sleeve 14, the cam 8 determines axial movement of the locking ring 7 between an axial locking position in correspondence with the angular locking position and an axial release position in correspondence with the angular release position.

When the locking ring 7 is in the axial locking position, the locking ring 7 presses the ratchet pawls 6 against the toothed ring 5 in opposition to a force exerted by the releasing elastic element, and when the locking ring 7 is in the axial release position, the locking ring 7 allows the force exerted by the releasing elastic element to separate the ratchet pawl 6 from the toothed ring 5.

The locking control sleeve 14 and the outer casing 2 have respective outer surfaces provided with gripping embossments 26, 27 facilitating a manual grip.

Figure 11:
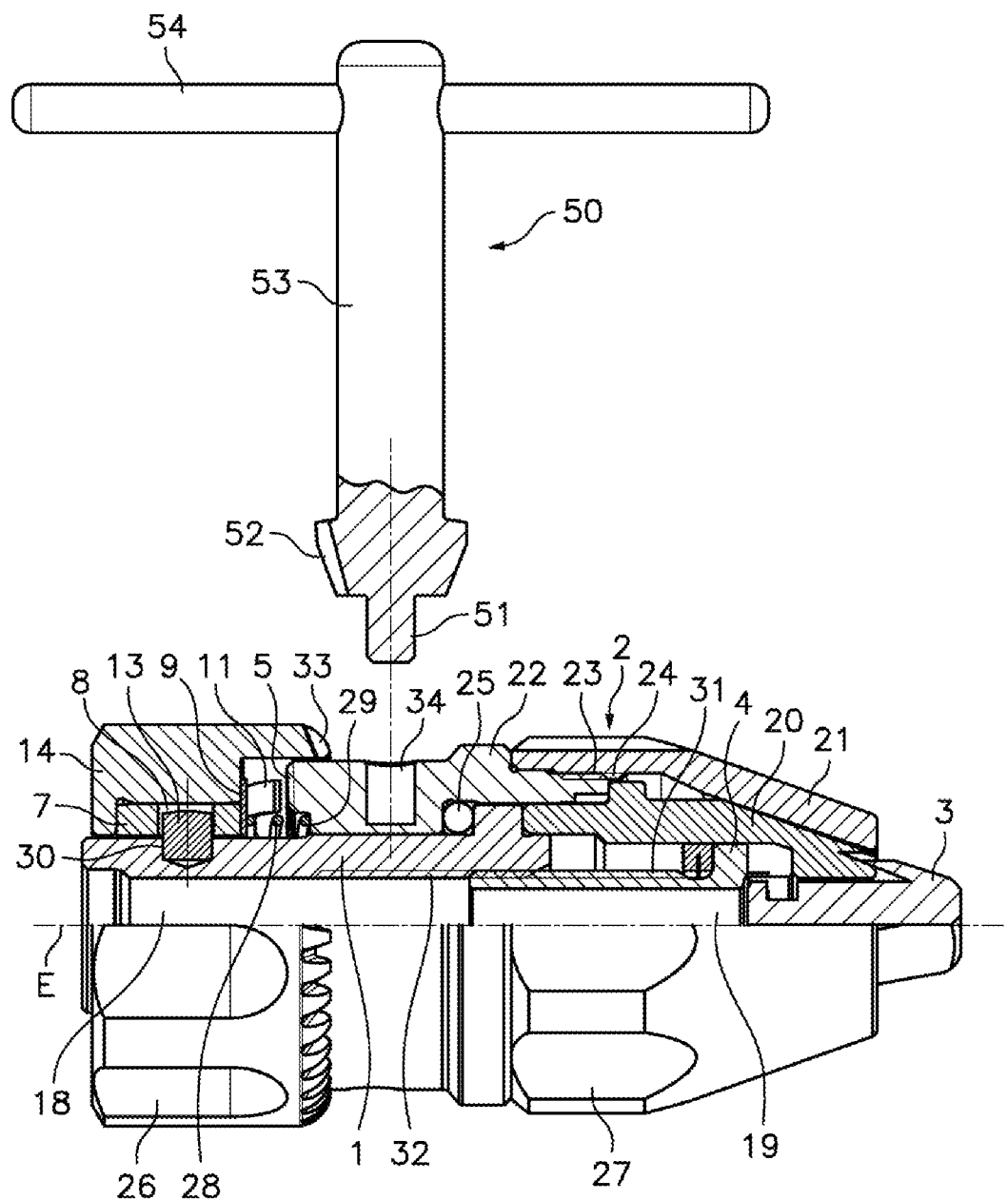
FIG. 11 is a partially sectioned side view of a chuck with locking device according to yet another embodiment of the present invention.

FIG. 11 shows yet another alternative embodiment of the chuck with locking device of the present invention, which combines a self-tightening fitting mechanism with a key mechanism.

The hybrid chuck of FIG. 11 comprises a base body 1, an outer casing 2, three jaws 3, a fitting mechanism linking movements of the outer casing 2 to movements of the jaws 3 to fit the jaws 3 to bits having different diameters, and a locking device.

The fitting mechanism is a self-tightening mechanism similar to the one described above in relation to FIGS. 1 to 3, and comprises a pusher 4 coupled inside the base body 1 by a threaded coupling 31, 32 and coupled to the outer casing 2 such that it can slide axially but not rotate coaxially, such that relative rotation between the pusher 4 and the base body 1 in one direction translates into axial displacement of the pusher 4, moving the jaws 3 towards the central longitudinal axis E, and relative rotation between the pusher 4 and the base body 1 in an opposite loosening direction moves the jaws 3 away from the central longitudinal axis E.

The locking device is similar to the one described above in relation to FIGS. 1 to 3 and comprises a ratchet mechanism operated by a locking control sleeve 14 in cooperation with a cam 8 (best shown in FIG. 4) and a releasing elastic element. The locking control sleeve 14 is coupled outside the base body 1 such that it can rotate between an angular locking position and an angular release position. The locking control sleeve 14 and the outer casing 2 have respective outer surfaces provided with gripping embossments 26, 27 facilitating a manual grip.

The cam 8 comprises a cam groove formed in a locking ring 7 and a pin 13 inserted in the cam groove and in a hole 30 perpendicular to the central longitudinal axis E formed in the base body 1. The cam 8 determines axial movement of the locking ring 7 between axial locking and release positions when the locking ring 7 is rotated by the locking control sleeve 14 coaxially with respect to the base body 1.

The ratchet mechanism comprises a toothed ring 5 formed at a rear end of the rear sleeve 22, and a ratchet ring 9 provided with interlocking elastic tabs 11 providing ratchet pawls 6 (best shown in FIG. 6). The ratchet pawls 6 interlock in the toothed ring 5 when the ratchet ring 9 is pushed by the locking ring 7 into the axial locking position.

The releasing elastic element is formed by a coil spring 28 under compression arranged between the ratchet ring 9 and an annular seat 29 formed in the outer casing 2. Alternatively, the releasing elastic element under compression can be formed by elastic spring tabs 12 formed in the ratchet ring 9 (FIG. 7), instead of the coil spring 28.

Additionally, the hybrid chuck with locking device of FIG. 11 is prepared for being able to tighten and loosen the jaws 3 using an auxiliary key 50 of a conventional type, which comprises a rod 53 ending in an end boss 51, and a bevel pinion 52 adjacent and coaxial to the end boss 51. The rod 53 has a cross-piece 54 or another protruding element facilitating the manual application of torque to the rod 53 connected thereto.

A bevel crown wheel 33 is formed on a front edge of the locking control sleeve 14, and a radial key guide hole 34 is formed in the rear sleeve 22 of the outer casing 2. The radial key guide hole 34 is located with respect to the bevel crown wheel 33 such that when the end boss 51 of the auxiliary key 50 is inserted in the radial key guide hole 34 the bevel pinion 52 of the auxiliary key 50 meshes with the bevel crown wheel 33. In this position, rotation of the auxiliary key 50 in a tightening direction imparts rotation of the base body 1 with respect to the outer casing 2 to move the jaws 3 to the closed position, and rotation of the auxiliary key 50 in an opposite release direction imparts rotation of the base body 1 with respect to the outer casing 2 to loosen the jaws 3 and move them to the open position.

Figure 12:
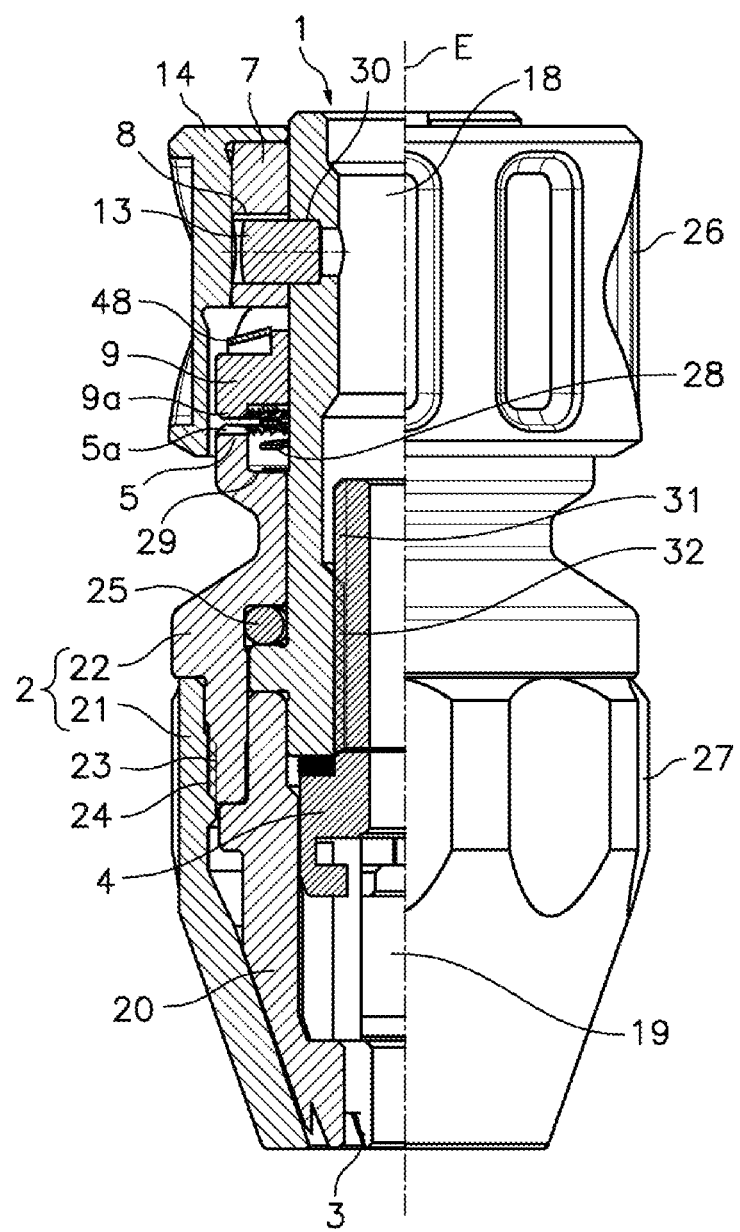
FIG. 12 is a partially sectioned side view of a chuck with locking device according to an additional embodiment of the present invention.

An additional embodiment of the chuck with locking device of the present invention is now described with reference to FIGS. 12-14. The chuck with locking device shown in FIGS. 12-14 only differs from the embodiment described above with reference to FIGS. 1-7 in that the ratchet ring 9 is made of solid material, such as for example solid metal, and has an annular body and a plurality of teeth 9a protruding from the annular body and facing the asymmetrical teeth 5a of the toothed ring 5. The teeth 9a of the solid material ratchet ring 9 are complementary to the asymmetrical teeth 5a of the toothed ring 5. A pressing elastic element 48 is arranged under compression between the ratchet ring 9 and the locking ring 7.

The asymmetrical profile of the teeth and the elasticity of the pressing elastic element 48 allows the ratchet ring 9 to retract away from the toothed ring 5 and thereby disengage the teeth 9a of the solid material ratchet ring 9 from the asymmetrical teeth 5a of the toothed ring 5 when the locking device is in the locking position and the outer casing 2 is rotated relative to the base body 1 in a tightening direction for tightening the grip of the jaws 3.

In the shown example, the pressing elastic element 48 is a wave ring spring having a first end supported on a support surface of the locking ring 7 and a second end supported on the ratchet ring 9, and the releasing elastic element is a coil spring 28 having a first end supported in the ratchet ring 9 and a second end supported in an annular seat 29 formed in the outer casing 2. Alternatively the pressing elastic element and the releasing elastic element can be of any other type provided that they dimensionally fit the chuck components and have an adequate elasticity coefficient.

The scope of the present invention is defined by the attached claims.

The invention claimed is:

1. A chuck with locking device, comprising:
   a base body having a central longitudinal axis and being connectable for rotating with a drive shaft;
   an outer casing coupled outside said base body such that it can rotate coaxially but not move axially with respect to the base body, said outer casing having an axial opening;
   a plurality of jaws arranged movably with respect to the base body and the outer casing communicated with said axial opening;
   a fitting mechanism linking movements of the outer casing to movements of the jaws, such that rotation of the outer casing with respect to the base body in a tightening direction moves the jaws towards said central longitudinal axis and rotation of the outer casing with respect to the base body in an opposite loosening direction moves the jaws away from the central longitudinal axis; and
   a locking device comprising a ratchet mechanism operated by a locking control sleeve coupled outside the base body such that it can rotate between angular locking and release positions in cooperation with a cam and an elastic element, where said ratchet mechanism, when said locking control sleeve is in said angular locking position, blocks relative rotation between the base body and the outer casing in a loosening direction for loosening the grip of the jaws but allows relative rotation in a tightening direction for tightening the grip of the jaws, and when the locking control sleeve is in said angular release position, it allows relative rotation between the base body and the outer casing in both directions,
   characterized in that the ratchet mechanism comprises:
   a toothed ring that is fixed with respect to the outer casing, said toothed ring having a plurality of asymmetrical teeth;
   a ratchet ring facing the toothed ring and arranged such that the ratchet ring can slide axially but not rotate coaxially with respect to the base body, said ratchet ring comprising an annular body and one or more ratchet pawls or teeth projecting from said annular body towards said asymmetrical teeth of the toothed ring, said elastic element being a releasing elastic element arranged under compression between the ratchet ring and the toothed ring;
   a locking ring arranged outside the base body and fixed inside to the locking control sleeve in a position adjacent to the ratchet ring on a side thereof opposite the toothed ring;
   said cam comprising a cam groove formed in a wall of the locking ring and a pin inserted in said cam groove and in a hole perpendicular to the central longitudinal axis formed in the base body, the cam determining axial movement of the locking ring between axial locking and release positions corresponding to the angular locking and release positions, respectively, when the locking ring is rotated by the locking control sleeve coaxially with respect to the base body;
   wherein the locking ring, when it is in said axial locking position, presses said ratchet pawls or teeth against the toothed ring in opposition to a force exerted by said releasing elastic element, and when it is in said axial release position, it allows said force exerted by the releasing elastic element to separate the ratchet pawls or teeth from the toothed ring.

2. The chuck with locking device according to claim 1, wherein the ratchet ring is made of solid material, said teeth of the ratchet ring are complementary to the asymmetrical teeth of the toothed ring, and a pressing elastic element is arranged under compression between the ratchet ring and the locking ring.

3. The chuck with locking device according to claim 1, wherein the ratchet ring is an annular body made of steel spring sheet metal and the annular body has cuts defining interlocking elastic tabs projecting from the annular body inclined towards the asymmetrical teeth of the toothed ring and having a respective free ends providing a said ratchet pawls.

4. The chuck with locking device according to claim 3, wherein the releasing elastic element is formed by one or more elastic spring tabs defined by additional cuts formed in the ratchet ring and projecting from the ratchet ring inclined towards the toothed ring, each of the elastic spring tabs having a rounded end portion resting on the asymmetrical teeth of the toothed ring, said rounded end portions being arranged at a greater axial distance from the ratchet ring than the ratchet pawls of the interlocking elastic tabs.

5. The chuck with locking device according to claim 1, wherein said fitting mechanism comprises a pusher coupled to the base body by a threaded coupling and coupled to the outer casing such that it can slide axially but not rotate coaxially, said pusher being operatively coupled with said jaws, such that rotation of the outer casing together with said pusher with respect to the base body in a tightening direction moves the jaws towards said central longitudinal axis and rotation of the outer casing together with the pusher with respect to the base body in an opposite loosening direction moves the jaws away from the central longitudinal axis.

6. The chuck with locking device according to claim 5, wherein the base body has an axial through hole and the pusher has an axial through hole aligned and communicated with said axial through hole of the base body.

7. The chuck with locking device according to claim 5, wherein the outer casing comprises a front fitting sleeve in which the jaws are housed and a rear sleeve having a rear end in which the asymmetrical teeth of the toothed ring are formed, said front fitting sleeve and said rear sleeve being fixedly connected to one another by a threaded coupling.

8. The chuck with locking device according to claim 7, wherein the jaws are coupled to guides formed in a guide body housed in the front fitting sleeve and immobilized with respect to the outer casing.

9. The chuck with locking device according to claim 7, wherein the outer casing rotates with respect to the base body in cooperation with rolling elements arranged between the rear sleeve and the base body to withstand axial loads.

10. The chuck with locking device according to claim 7, wherein the locking control sleeve has a bevel crown wheel and the rear sleeve of the outer casing has a radial key guide hole, where said radial key guide hole is configured and arranged to receive an end boss of an auxiliary key and said bevel crown wheel is configured and arranged to mesh with a bevel pinion of said auxiliary key when said end boss of the auxiliary key is inserted in said radial key guide hole.

11. The chuck with locking device according to claim 5, wherein the pusher has outer screw threads coupled to inner screw threads formed in the base body.

12. The chuck with locking device according to claim 1, wherein said fitting mechanism comprises an actuator ring fixed inside the outer casing, said actuator ring having screw threads coupled to thread teeth formed in said jaws, such that rotation of the actuator ring with respect to the base body in a tightening direction moves the jaws towards said central longitudinal axis and rotation of the actuator ring with respect to the base body in an opposite loosening direction moves the jaws away from the central longitudinal axis.

13. The chuck with locking device according to claim 12, wherein the jaws are housed in guide holes formed in the base body, said guide holes being inclined in converging directions towards the central longitudinal axis, and wherein the actuator ring is inserted in a circumferential groove formed in the base body, there being in said circumferential groove openings communicated with the guide holes.

14. The chuck with locking device according to claim 1, wherein the locking control sleeve has an inner surface covering the cam groove and retaining said pin inserted in the cam groove and in said hole of the base body.

15. The chuck with locking device according to claim 1, wherein the releasing elastic element is formed by a coil spring having a first end supported in the ratchet ring and a second end supported in an annular seat formed in the outer casing.

16. The chuck with locking device according to claim 1, wherein the releasing elastic element is formed by a coil spring having a first end supported in the ratchet ring and a second end supported in an annular seat formed in the base body.

17. The chuck with locking device according to claim 1, wherein the base body has a cylindrical portion inserted through a central hole of the ratchet ring, said cylindrical portion of the base body has an outer surface in which at least one retaining groove parallel to the central longitudinal axis is formed, the ratchet ring has at least one retaining tongue extending towards the central longitudinal axis from an inner edge of said central hole of the ratchet ring, and said retaining tongue is inserted in said retaining groove of the base body preventing relative rotation between the ratchet ring and the base body.

18. The chuck with locking device according to claim 1, wherein the cam groove comprised in the cam extends in a circumferential direction between a first end and a second end, said first end being closer in an axial direction to a support surface of the locking ring adjacent to the ratchet ring than said second end.

19. The chuck with locking device according to claim 18, wherein the cam groove comprised in the cam furthermore has a first intermediate point located closer in said circumferential direction to the first end than to the second end and farther away in said axial direction from said support surface than the second end, and a second intermediate point located closer in the circumferential direction to the second end than to the first end and at the same distance in the axial direction from the support surface as the second end.

20. A chuck with locking device, comprising:
a base body having a central longitudinal axis and being connectable for rotating with a drive shaft;
an outer casing coupled outside said base body such that it can rotate coaxially but not move axially with respect to the base body, said outer casing having an axial opening;
a plurality of jaws arranged movably with respect to the base body and the outer casing communicated with said axial opening;
a fitting mechanism linking movements of the outer casing to movements of the jaws, such that rotation of the outer casing with respect to the base body in a tightening direction moves the jaws towards said central longitudinal axis and rotation of the outer casing with respect to the base body in an opposite loosening direction moves the jaws away from the central longitudinal axis; and
a locking device comprising a ratchet mechanism operated by a locking control sleeve coupled outside the base body such that it can rotate between angular locking and release positions in cooperation with a cam and an elastic element, where said ratchet mechanism, when said locking control sleeve is in said angular locking position, blocks relative rotation between the base body and the outer casing in a loosening direction for loosening the grip of the jaws but allows relative rotation in a tightening direction for tightening the grip of the jaws, and when the locking control sleeve is in said angular release position, it allows relative rotation between the base body and the outer casing in both directions, wherein the ratchet mechanism comprises:

a toothed ring that is fixed with respect to the outer casing, said toothed ring having a plurality of asymmetrical teeth;

a ratchet ring facing the toothed ring and arranged such that the ratchet ring can slide axially but not rotate coaxially with respect to the base body, said ratchet ring comprising an annular body made of solid material and teeth projecting from said annular body towards said asymmetrical teeth of the toothed ring, said elastic element being a releasing elastic element arranged under compression between the ratchet ring and the toothed ring;

a locking ring arranged outside the base body and fixed inside to the locking control sleeve in a position adjacent to the ratchet ring on a side thereof opposite the toothed ring, a pressing elastic element being arranged under compression between the ratchet ring and the locking ring;

said cam comprising a cam groove formed in a wall of the locking ring and a pin inserted in said cam groove and in a hole perpendicular to the central longitudinal axis formed in the base body, the cam determining axial movement of the locking ring between axial locking and release positions corresponding to the angular locking and release positions, respectively, when the locking ring is rotated by the locking control sleeve coaxially with respect to the base body;

wherein the locking ring, when it is in said axial locking position, presses said teeth against the toothed ring in opposition to a force exerted by said releasing elastic element, and when it is in said axial release position, it allows said force exerted by the releasing elastic element to separate the teeth from the toothed ring.

21. The chuck with locking device according to claim 20, wherein said fitting mechanism comprises a pusher coupled to the base body by a threaded coupling and coupled to the outer casing such that it can slide axially but not rotate coaxially, said pusher being operatively coupled with said jaws, such that rotation of the outer casing together with the pusher with respect to the base body in a tightening direction moves the jaws towards said central longitudinal axis and rotation of the outer casing together with the pusher with respect to the base body in an opposite loosening direction moves the jaws away from the central longitudinal axis.

* * * * *